United States Patent
Hama et al.

(10) Patent No.: US 6,924,578 B2
(45) Date of Patent: Aug. 2, 2005

(54) ELECTRIC MOTOR

(75) Inventors: Yohei Hama, Tochigi (JP); Akira Fujisaki, Tochigi (JP)

(73) Assignee: Showa Corporation (JP)

( * ) Notice: Subject to any disclaimer, the term of this patent is extended or adjusted under 35 U.S.C. 154(b) by 58 days.

(21) Appl. No.: 10/720,502

(22) Filed: Nov. 24, 2003

(65) Prior Publication Data

US 2004/0201296 A1 Oct. 14, 2004

(30) Foreign Application Priority Data

Apr. 14, 2003 (JP) ........................................ 2003-109564

(51) Int. Cl.[7] ........................ H02K 13/00; H02K 11/00; H02K 5/22
(52) U.S. Cl. ........................................ 310/239; 310/71
(58) Field of Search ................................ 310/239, 249, 310/71

(56) References Cited

U.S. PATENT DOCUMENTS

| 3,763,458 A | | 10/1973 | Mc Cardell | |
|---|---|---|---|---|
| 4,124,264 A | | 11/1978 | Kato | |
| 4,926,078 A | * | 5/1990 | Isozumi et al. | 310/71 |
| 5,148,073 A | * | 9/1992 | Tamura | 310/239 |
| 5,343,102 A | * | 8/1994 | Mabuchi et al. | 310/71 |
| 5,556,304 A | | 9/1996 | Jinno | |
| 5,952,763 A | * | 9/1999 | Bruhn | 310/238 |
| 6,011,341 A | * | 1/2000 | Toya et al. | 310/239 |
| 6,570,280 B2 | * | 5/2003 | Takahashi | 310/71 |
| 6,824,366 B2 | * | 11/2004 | Nagasaka et al. | 417/423.1 |
| 6,836,050 B2 | * | 12/2004 | Akabane et al. | 310/239 |

FOREIGN PATENT DOCUMENTS

| EP | 0638982 | 2/1995 |
|---|---|---|
| EP | 1193841 | 4/2002 |
| JP | 984300 | 3/1997 |
| JP | 3207177 | 7/2001 |

OTHER PUBLICATIONS

JP 2002 233097, Showa Corporation, Dec. 12, 2002.
JP 2003 079109, ASMO Co Ltd, Mar. 14, 20003.

* cited by examiner

*Primary Examiner*—Tran Nguyen
(74) *Attorney, Agent, or Firm*—Orum & Roth LLC

(57) ABSTRACT

An electric motor provided with a terminal insertion hole to which a terminal connected to a brush is inserted, in a feed connector, a fitting hole is formed in a base end portion of the terminal, a projection is formed in a side of a brush holder, and the fitting hole of the terminal inserted into the terminal insertion hole can be fitted to the projection of the brush holder.

18 Claims, 12 Drawing Sheets

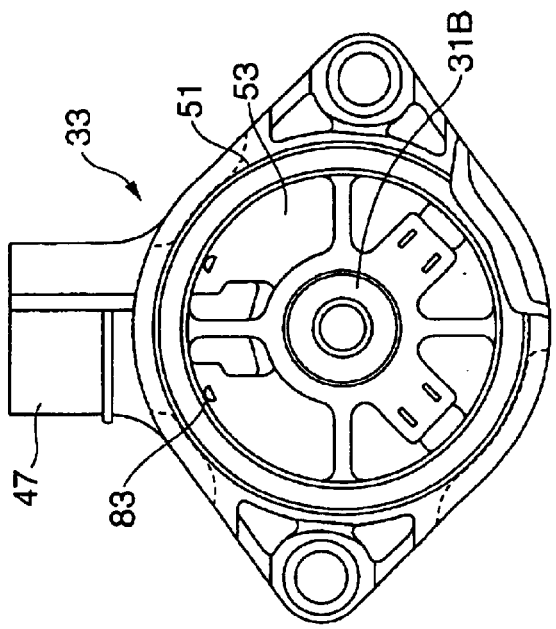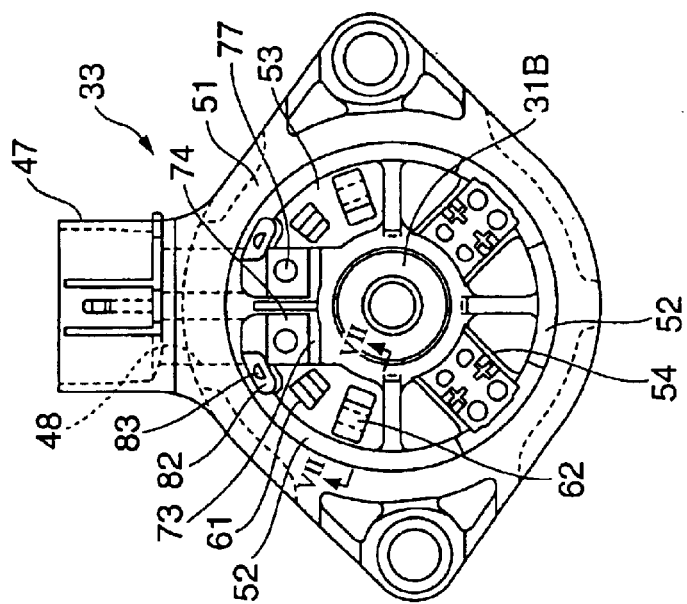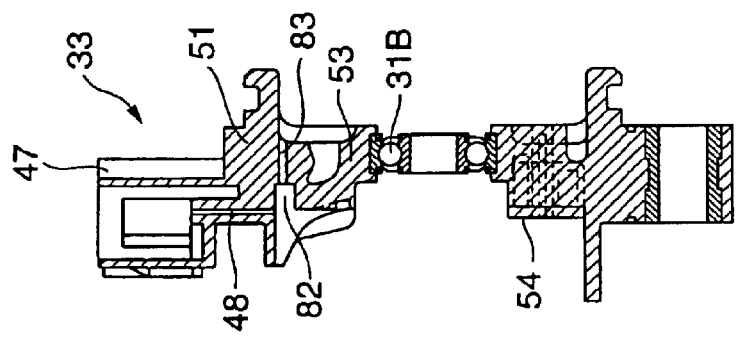

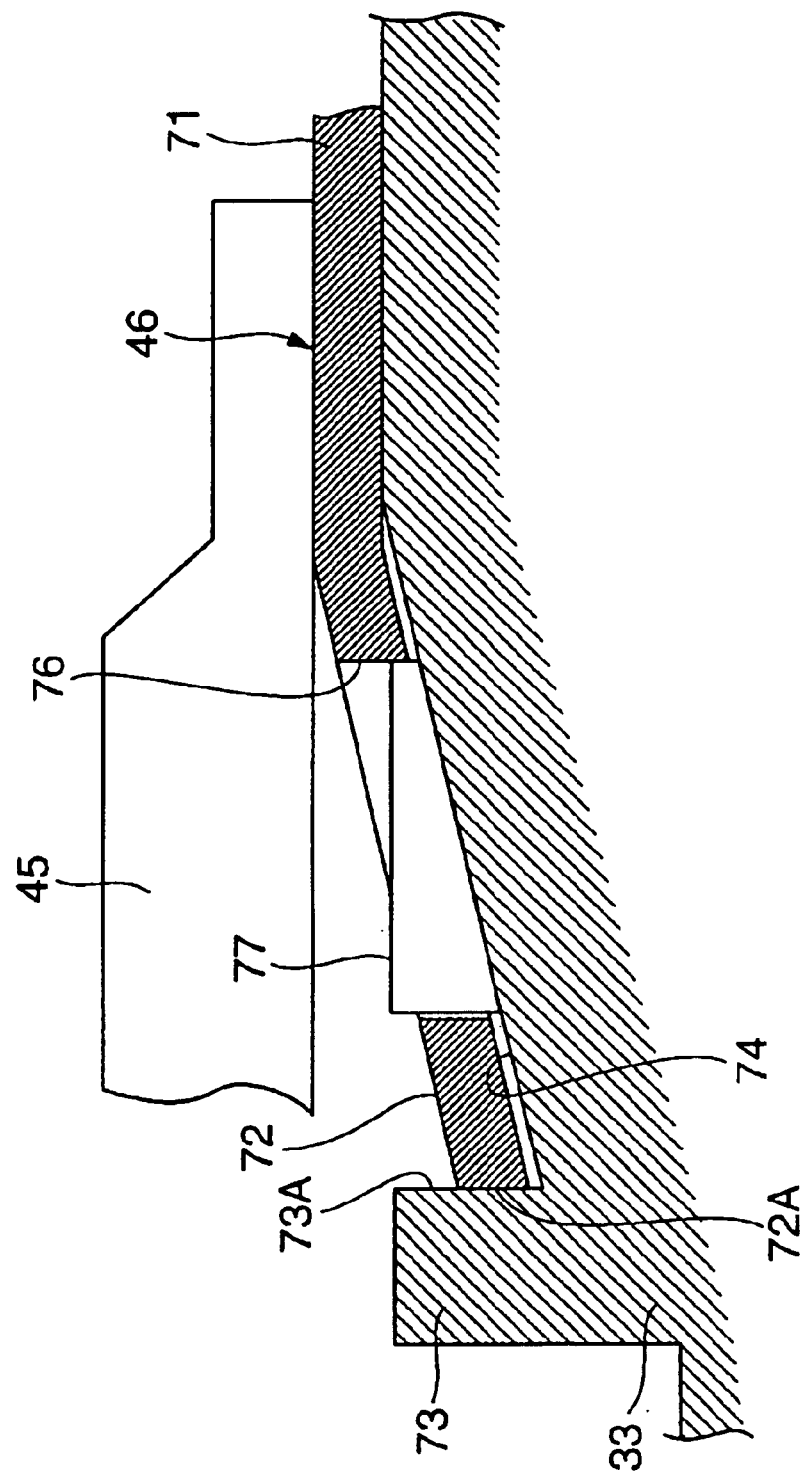

ELECTRIC MOTOR

BACKGROUND OF THE INVENTION

1. Field of the Invention

The present invention relates to an electric motor preferably used in a motor-driven power steering apparatus or the like.

2. Description of the Related Art

A motor-driven power steering apparatus for a vehicle is structured, as described in Japanese Patent Application Laid-Open No. H9-84300 (patent document 1), such that an assist shaft of a steering apparatus is connected to a rotation shaft of an electric motor, and a rotation force of the electric motor is transmitted to the steering apparatus, thereby assisting steering force applied to a steering shaft by a driver.

A conventional electric motor is structured, as described in Japanese Patent No. 3207177 (patent document 2) such that a pigtail firmly fixed to a brush is connected to a conductor insert molded integrally with a brush holder base at one end thereof. An electric power is fed from a connector which is connected to a lead wire extending to an outer portion from another end of the conductor and is held by an outer terminal.

In a conventional electric motor, in order to reduce the number of connecting portions between outer terminals, a structure in which a terminal insertion hole, to which a terminal connected to a brush is inserted, is provided in a feed connector integrally formed with a brush holder, and an opposing connector is connected to the terminal inserted into the terminal insertion hole. A come-off or unintentional disassembly preventing means is supplied for preventing the terminal from coming off from the terminal insertion hole on the basis of a pressing force applied by the opposing connector. A tongue-like prevention hook is provided in the brush holder, the terminal elastically deforms the come-off or unintentional disassembly prevention hook during a step of being inserted into the terminal insertion hole, and the come-off or unintentional disassembly prevention hook restoring after inserting the terminal to the terminal insertion hole is abutted against a base end portion of the terminal. However, the tongue-like come-off or unintentional disassembly prevention hook provided in the brush holder tends to be cracked and broken, and the productivity and a reliability of the electric motor tend to be damaged.

Further, as a drag-in preventing means for preventing the terminal from being dragged in the terminal insertion hole by a pulling force applied by the opposing connector when canceling the connection of the opposing connector after connecting the opposing connector to the terminal inserted into the terminal insertion hole, a structure in which a pigtail connection portion welded to the terminal is employed. The pigtail connection portion abuts against an opening peripheral edge of the terminal insertion hole so as to prevent the terminal from being dragged in. However, in the case where the welding position of the pigtail to the terminal is displaced even a little amount, the terminal may tend to move in a direction of dragging in.

SUMMARY OF THE INVENTION

An object of the present invention is to prevent a terminal inserted into a terminal insertion hole from coming off from the terminal insertion hole and to securely prevent the terminal from being dragged in the terminal insertion hole, in an electric motor in which the terminal is inserted into the terminal insertion hole.

The present invention relates to an electric motor having a brush holding portion provided in a brush holder; and a terminal insertion hole to which a terminal connected to a brush is inserted. The terminal insertion hole is disposed in a feed connector integrally formed with the brush holder. A fitting hole is formed in a base end portion of the terminal, and a projection is formed in the brush holder. The fitting hole of the terminal inserted to the terminal insertion hole is freely fitted to a projection of the brush holder.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A to 6C show a brush holder, in which FIG. 6A is a cross sectional view, FIG. 6B is a left side elevational view and FIG. 6C is a right side elevational view;

FIGS. 8A to 8C show a magnet holder, in which FIG. 8A is a cross sectional view, FIG. 8B is a cross sectional view along a line B—B in FIG. 8A and FIG. 8C is an end elevational view;

FIGS. 9A to 9C show a brush, in which FIG. 9A is a side elevational view, FIG. 9B is a plan view and FIG. 9C is a bottom elevational view of a main portion;

FIGS. 10A and 10B show an inserting structure of the terminal, in which FIG. 10A is a cross sectional view showing an inserted state, and FIG. 10B is a cross sectional view showing an inserting step;

FIG. 11 is an enlarged view of a main portion in FIG. 10A; and

FIGS. 12A and 12B show an assembling state of a terminal, in which FIG. 12A is a schematic view showing a good or desirable assembly and FIG. 12B is a schematic view showing a bad or undesirable assembly.

DESCRIPTION OF THE PREFERRED EMBODIMENTS

Figure 1:
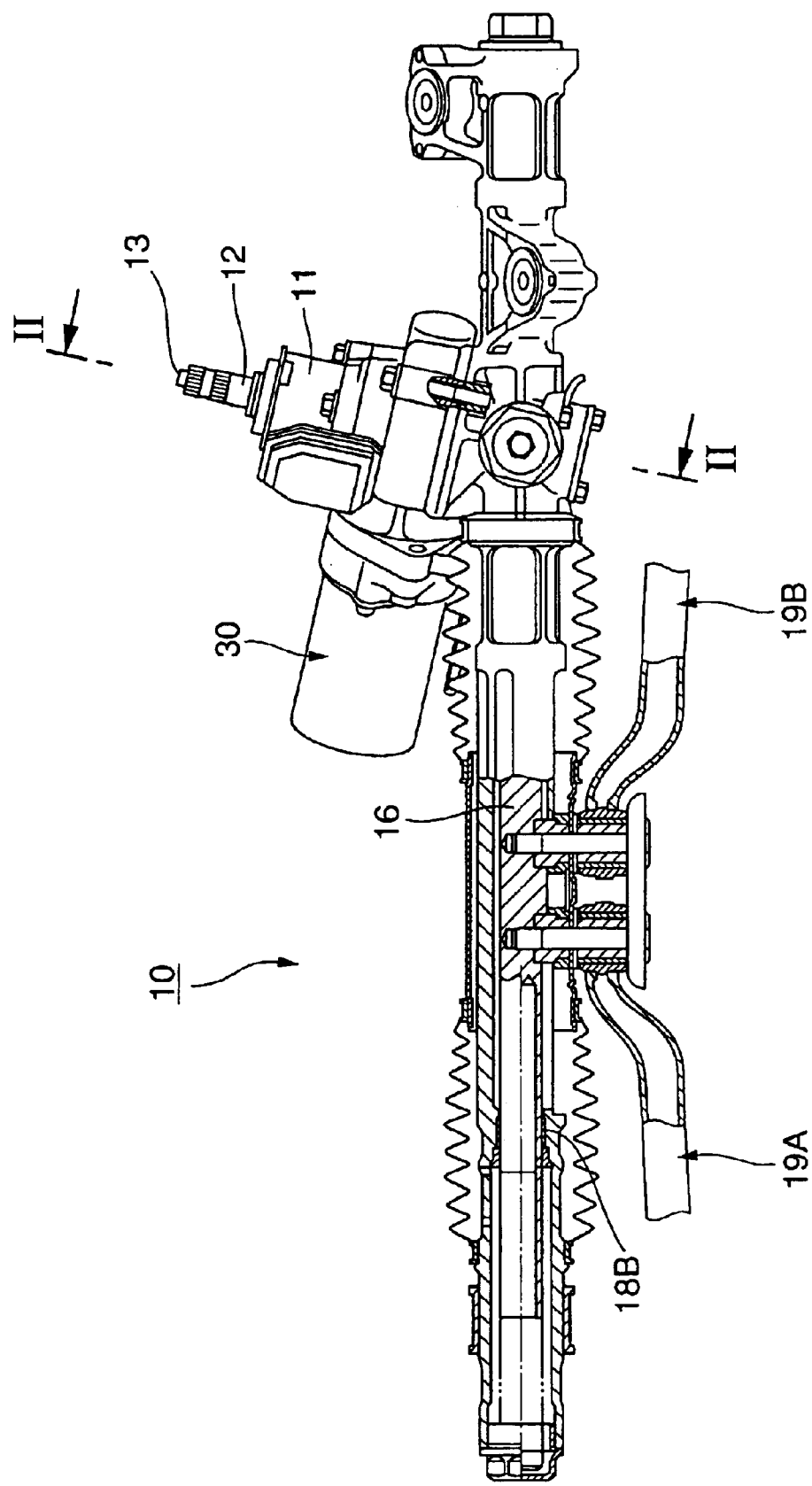
FIG. 1 is a front elevational view showing an electric power steering apparatus in a partly broken manner.
Figure 2:
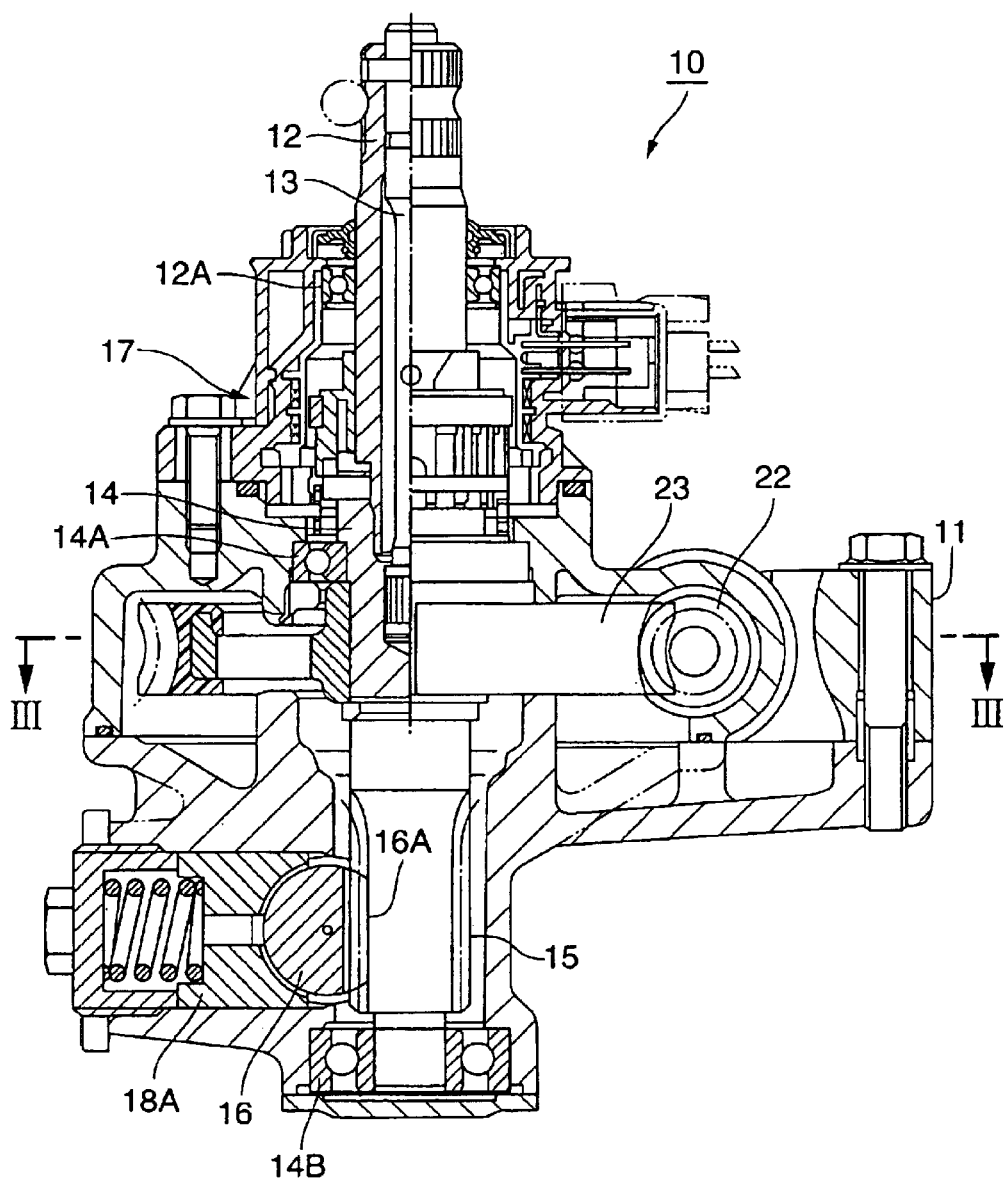
FIG. 2 is a cross sectional view along a line II—II in FIG. 1.

An electric power steering apparatus 10 has an aluminum alloy gear housing 11 fixed to a vehicle body frame or the like, as shown in FIGS. 1 and 2. A pinion shaft 14 is connected via a torsion bar 13 to a steering shaft 12 to which a steering wheel is connected. A pinion 15 is provided in the pinion shaft 14, and a rack shaft 16 provided with a rack 16A engaged with the pinion 15 is supported to the gear housing 11 so as to freely move right and left. A steering torque detection apparatus 17 is provided between the steering shaft 12 and the pinion shaft 14. In this case, the steering shaft 12 and the pinion shaft 14 are supported to the gear housing 11 via bearings 12A, 14A and 14B. The rack shaft 16 is slidably supported to a rack guide 18A in one end and to a bearing 18B in another end. Further, left and right tie rods 19A and 19B are connected to a middle portion of the rack shaft 16.

Figure 3:
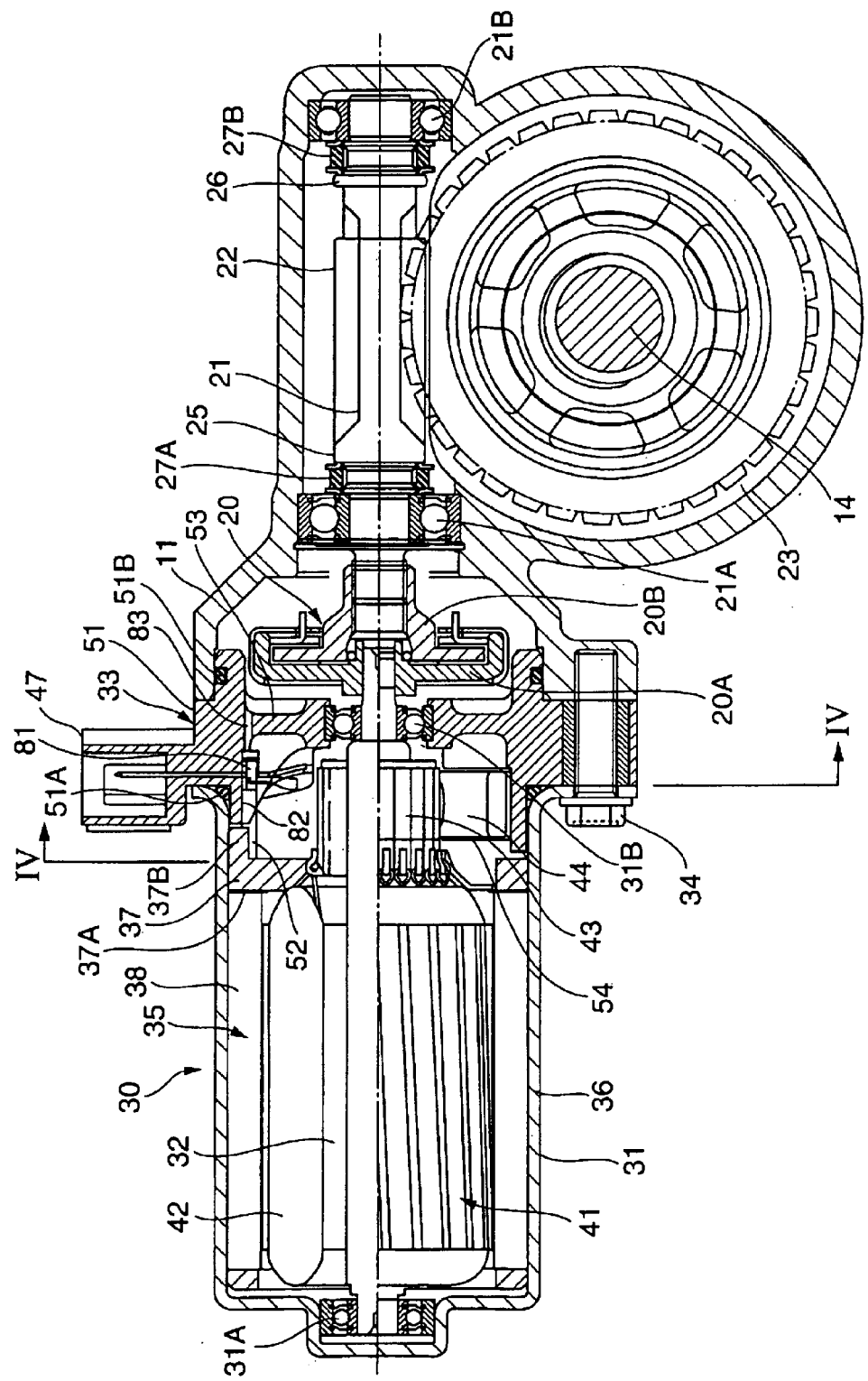
FIG. 3 is a cross sectional view along a line III—III in FIG. 2.

A motor case 31 of an electric motor 30 is fixed to the gear housing 11, as shown in FIG. 3, an assist shaft 21 is connected to a rotation shaft 32 of the electric motor 30 via a torque limiter 20, and the assist shaft 21 is supported to the gear housing 11 in both ends by bearings 21A and 21B such as a ball bearing or the like. Further, a worm gear 22 is integrally provided in a middle portion of the assist shaft 21, and a worm wheel 23 engaged with the worm gear 22 is fixed to a middle portion of the pinion shaft 14. A generated torque in the electric motor 30 is applied as a steering assist force to the rack shaft 16 via an engagement between the worm gear 22 and the worm wheel 23 and an engagement between the pinion 15 and the rack 16A, thereby assisting a steering force applied to the steering shaft 12 by a driver.

The torque limiter 20 may be a friction plate type torque limiter including a connection body 20A connected to the rotation shaft 32 of the electric motor 30, and a connection body 20B connected to the assist shaft 21. In a normally used torque, such as a smaller torque than a limit torque, of the electric power steering apparatus 10, the rotation shaft 32 and the assist shaft 21 are continuously connected without slipping on the basis of a friction force of the torque limiter 20. Alternatively, in the case of an impact torque, such as a torque equal to or larger than the limit torque, in which an inertia torque of the electric motor 30 overcomes the friction force of the torque limiter 20 when a stroke of the rack shaft 16 is suddenly stopped due to a situation such as running a tire on the curb during the steering, or the like, the rotation shaft 32 is made to be slipped with respect to the assist shaft 21. The torque limiter functions so as to prevent the torque of the electric motor 30 from being transmitted to a side of the assist shaft 21.

The assist shaft 21 is elastically supported to the housing 11 bidirectionally in an axial direction, and can absorb an excessive thrust applied to the assist shaft 21, when the electric power steering apparatus 10 is reverse driven or the tire runs on the curb. In particular, outer rings of the bearings 21A and 21B for the assist shaft 21 are fixed to the gear housing 11, and the assist shaft 21 is loosely fitted to inner rings of the bearings 21A and 21B. Further, flanges 25 and 26 are provided in the assist shaft 21, and a pre-compressed elastic deforming device 27A is interposed between the flange 25 and the inner ring of the bearing 21A. A pre-compressed elastic deforming device 27B is interposed between the flange 26 and the inner ring of the bearing 21B. The elastic deforming devices 27A and 27B are assembled with a fixed pre-compressed amount (a fixed impact reducing performance) in a state in which the elastic deforming devices 27A and 27B are loaded in the assist shaft 21, thereby elastically supporting the assist shaft 21 bidirectionally in the axial direction.

In this case, the electric motor 30 is structured as follows.

Figure 4:
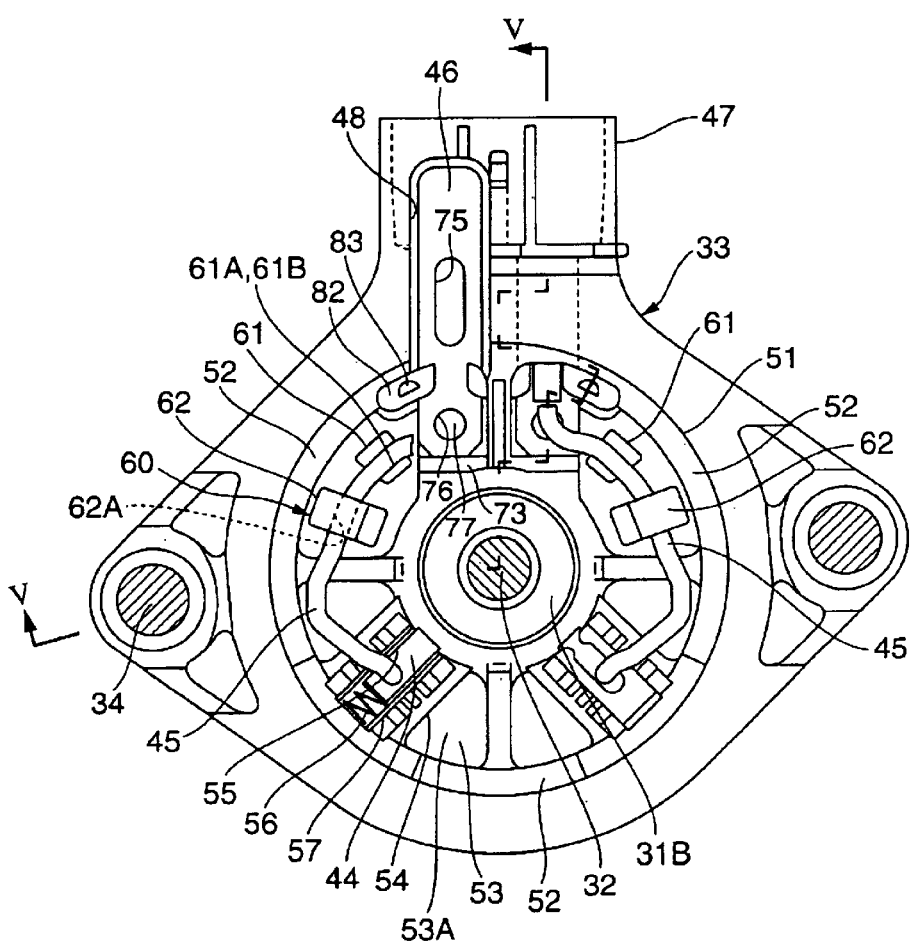
FIG. 4 is a view as seen from an arrow IV—IV in FIG. 3.
Figure 5:
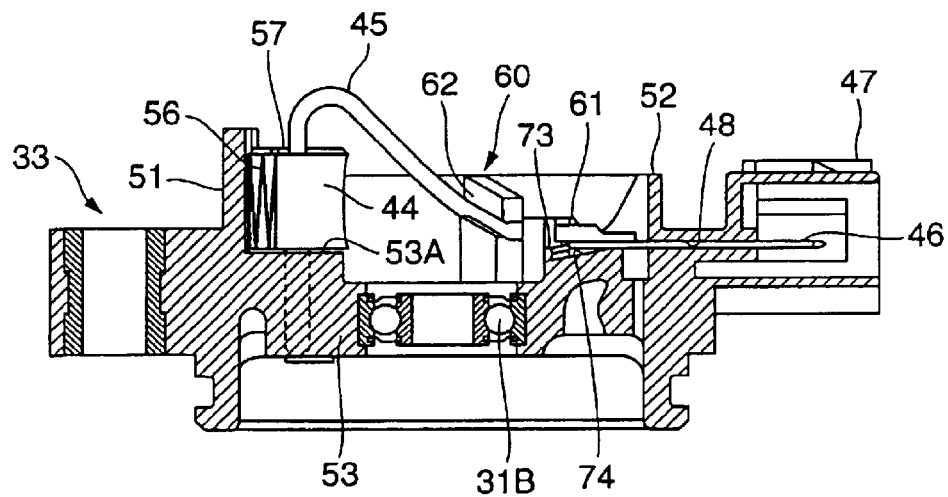
FIG. 5 is a cross sectional view along a line V—V in FIG. 4.

The electric motor 30 is structured, as shown in FIGS. 3 to 5, such that a motor case 31 and a brush holder 33 (FIGS. 6A to 6C, and FIG. 7) are fixed to the gear housing 11 by a bolt 34. The rotation shaft 32 is supported by bearings 31A and 31B constituted by a ball bearing or the like respectively provided in the motor case 31 and the brush holder 33.

The electric motor 30 has a stator 35. The stator 35 is constituted by a tubular yoke 36 forming a motor case 31 and is made of a magnetic material such as iron or the like. A magnet holder 37 (FIGS. 8A to 8C) forms magnet receiving sections 37A in a plurality of positions in a peripheral direction of an inner yoke of the yoke 36 and is constituted by a tubular body formed by an insulating resin material. Magnets 38 received in the magnet receiving sections 37A of the magnet holder 37 so as to be positioned and held, and a magnet cover 39, not shown, formed by a non-magnetic ultrathin plate pressure inserted to inner sides of the magnets 38 position and secure the magnet holder 37.

The electric motor 30 has a rotor 41 which is inserted to an inner side of the stator 35 and is fixed to the rotation shaft 32. The rotor 41 is constituted by an armature core 42 provided in an outer periphery of the rotation shaft 32 and a commutator 43.

Figure 9A:
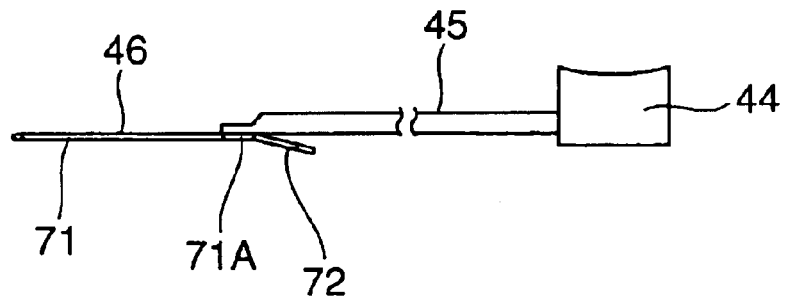
Figure 9B:
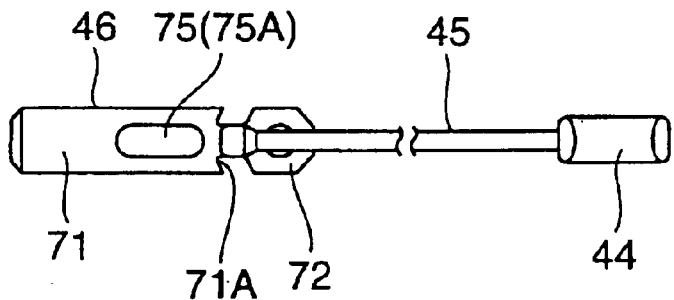
Figure 9C:
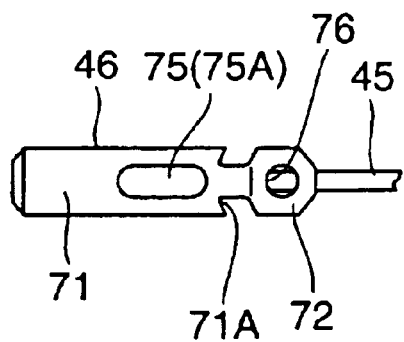

The electric motor 30 has a brush 44 which is held by the brush holder 33, and is brought into contact with a commutator 43 of a rotor 41. The brush 44 is connected to one end of a pigtail (a lead wire) 45, and a terminal 46 is connected to another end of the pigtail 45, as shown in FIGS. 9A to 9C. The brush holder 33 integrally has a feed connector 47, and is provided with a terminal insertion hole 48 in the feed connector 47. The terminal 46 mentioned above connected to the brush 44 is inserted to the terminal insertion hole 48 so as to be fixed.

The electric motor 30 is structured such that an opposing connector, not shown, is mounted to the feed connector 47, and a feed terminal of the opposing connector is connected to the terminal 46 in a fitting state or the like, thereby feeding to the brush 44. In the electric motor 30, when electric current is fed to the armature core 42 from the brush 44 via the commutator 43 of the rotor 41, a line of magnetic force of the armature core 42 shuts off a magnetic field generated in the magnet 38 of the stator 35, whereby the rotor 41 is rotated.

Accordingly, the brush holder 33 is structured as shown in FIGS. 6A to 6C, and FIG. 7.

The brush holder 33 is an injection molded body integrally molded with the feed connector 47 and may be made of an insulative plastic material. The brush holder 33 is structured such that the yoke 36 (the motor case 31) is faucet connected to one end side of a short cylinder body 51 together with an O-ring 51A, and the gear housing 11 is faucet connected to another end side of the short cylinder body 51 together with an O-ring 51B. The brush holder 33 is clamped between the yoke 36 and the gear housing 11, and can coaxially connect three elements comprising the yoke 36, the brush holder 33 and the gear housing 11 by the bolt 34.

In the brush holder 33, an engagement concave portion 52 is formed in a specified position in a peripheral direction (two positions in the present embodiment) in one end side of the short cylinder body 51. It is possible to prevent the brush 44 held by the brush holder 33 from being displaced from the magnet 38 of the stator 35 positioned by the magnet holder 37, by engaging a circular arch engagement convex portion 37B provided along an outer periphery on one end surface of the magnet holder 37 with the engagement concave portion 52. It is thereby possible to avoid a rotation performance of the electric motor 30 from being different between the forward rotating direction and the backward rotating direction.

The brush holder 33 is provided with a partition wall 53 for partitioning the inner portion of the yoke 36 from the inner portion of the gear housing 11 in an inner portion of the short cylinder body 51. The brush holder 33 is provided with the bearing 31B mentioned above constituted by a ball bearing or the like for the rotation shaft 32 in a center portion of the partition wall 53 in accordance with an integral insert molding.

The brush holder 33 is structured such that an end surface of the partition wall 53 facing to the commutator 43 is set to a holder surface 53A, brush holding portions 54 are provided in a plurality of positions for example, two positions comprising right and left positions, in a peripheral direction on the holder surface 53A. A case body 57 in which through holes 55 for slidably inserting the right and left brushes 44 to the respective brush holding portions 54 are formed is assembled. The through hole 55 receives the brush 44 so as to slidably protrude to a side of the commutator 43 and hold the brush 44 in a positioned state. The brush holder 33 is additionally provided with a brush spring 56 which provides backup support for the brush 44 inserted to the through hole 55 and which makes the brush 44 to protrude from a leading end opening of the through hole 55 so as to push the brush 44 into contact with the commutator 43. In this case, FIG. 4 shows an assembled state in which the brush 44 and the brush spring 56 are assembled in one brush holding portion 54 of two brush holding portions 54, and only the brush 44 is assembled in the remaining brush holding portion 54.

A description will be given below of (A) a holding structure of the pigtail 45, (B) an elastic deforming structure of the terminal 46, (C) an unintended disassembly prevention structure and a drag-in prevention structure of the terminal 46, and (D) an installing structure of the terminal 46, in the electric motor 30.

(A) Holding structure of pigtail 45 in electric motor 30 (FIGS. 4 to 7)

The electric motor 30 has pigtail holding means 60 for holding the pigtails 45 connected to the brushes 44, in a plurality of positions, for example, right and left two positions corresponding to right and left two pigtails 45 respectively connected to right and left brushes 44, in the peripheral direction on the holder surface 53A formed by the partition wall 53 of the brush holder 33, as shown in FIGS. 4 to 6C. The pigtail holding means 60 holds the pigtail 45 in both of a lateral direction which may be shown as a horizontal direction along the holder surface 53A and a longitudinal direction which may be shown as a vertical direction orthogonal to the holder surface 53A.

The pigtail holding means 60 has a lateral direction pigtail holding portion 61 for holding an intermediate portion of the pigtail 45 in the lateral direction along the holder surface 53A, and a longitudinal direction pigtail holding portion 62 for holding the intermediate portion of the pigtail 45 in the longitudinal direction orthogonal to the holder surface 53A. The pigtail holding portion 61 and the pigtail holding portion 62 are arranged close to each other.

The lateral direction pigtail holding portion 61 has a concave holding groove 61A allowing for insertion of the pigtail 45, and is provided with an unintended disassembly prevention portion 61B for the pigtail 45 in an upward opening of the holding groove 61A. The unintended disassembly prevention portion 61B is provided in both side portions of the opening in the holding groove 61A so as to protrude in a round shape, making the opening of the holding groove 61A narrow.

Figure 7:
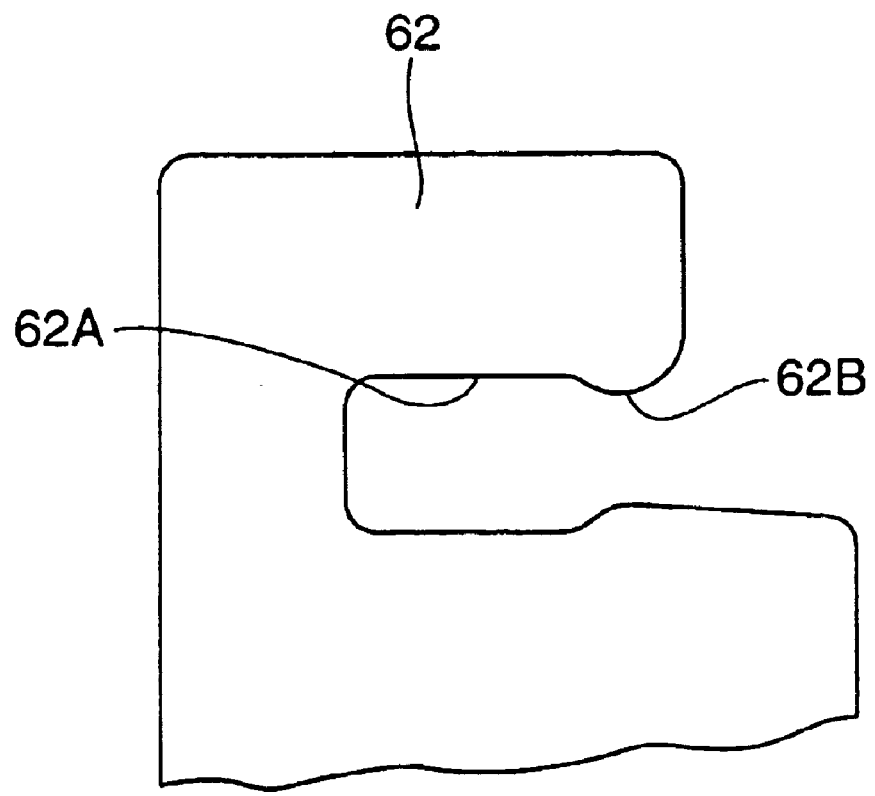
FIG. 7 is a view along a line VII—VII in FIG. 6B.

The longitudinal direction pigtail holding portion 62 has a concave holding groove 62A allowing for insertion of the pigtail 45, as shown in FIG. 7, and is provided with an unintended disassembly prevention portion 62B for the pigtail 45 in a transverse opening (an opening facing to a center axis of the brush holder 33) of the holding groove 62A. The unintended disassembly prevention portion 62B is provided in both side portions of the opening in the holding groove 62A so as to protrude in a round shape, making the opening of the holding groove 62A narrow.

In accordance with the present embodiment, since the holding structure of the pigtail 45 is provided in the electric motor 30, the following operations and effects can be achieved.

(1) In the electric motor 30, the pigtail holding means 60 provided on the holder surface 53A of the brush holder 33 holds the pigtail 45 in both of the lateral direction along the holder surface 53A and the longitudinal direction orthogonal to the holder surface 53A. Accordingly, the pigtail 45 is held in the horizontal and vertical directions and is not affected by vibration of the vehicle or the like, and motor performance such as current ripple or the like is not adversely affected.

(2) The pigtail holding means 60 has a lateral direction pigtail holding portion 61 and a longitudinal direction pigtail holding portion 62. Accordingly, it is possible to securely hold the pigtail 45 in the horizontal and vertical directions respectively by the lateral direction pigtail holding portion 61 and the longitudinal direction pigtail holding portion 62.

(3) Since the pigtail holding portions 61 and 62 are provided with the unintended disassembly prevention portions 61B and 62B in the openings of the holding grooves 61A and 62A allowing for insertion of the pigtails 45, it is possible to stably hold the pigtails 45 in the inner portions of the holding grooves 61A and 62A.

(4) In the electric motor 30 of the motor-driven power steering apparatus 10, the above items (1) to (3) can be achieved.

(B) Elastically deforming structure of terminal 46 in electric motor 30

The terminal 46 of the electric motor 30 is formed in a flat plate shape as a whole, as shown in FIGS. 9A to 9C, has a main body portion 71 inserted to the terminal insertion hole 48 and a bent base end portion 72 obliquely crossing to the main body portion 71, and connects the pigtail 45 to the bent base end portion 72.

A rising wall 73 is formed in a rear side of the terminal insertion hole 48 on the holder surface 53A in the brush holder 33, and a downward slope surface 74 formed in a downward slope toward the rising wall 73 is formed in a front side of the rising wall 73 (between the rising wall 73 and the terminal insertion hole 48).

Figure 10A:
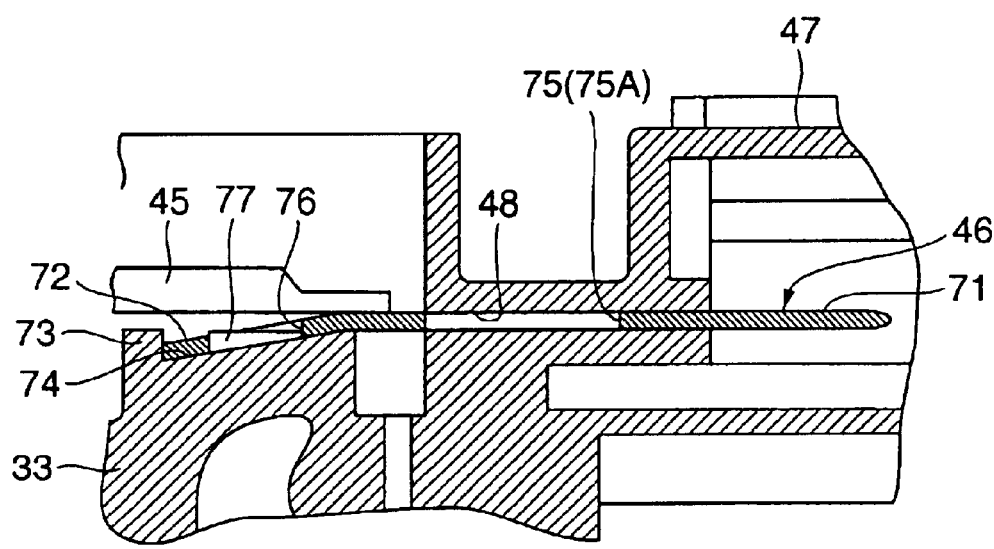
Figure 10B:
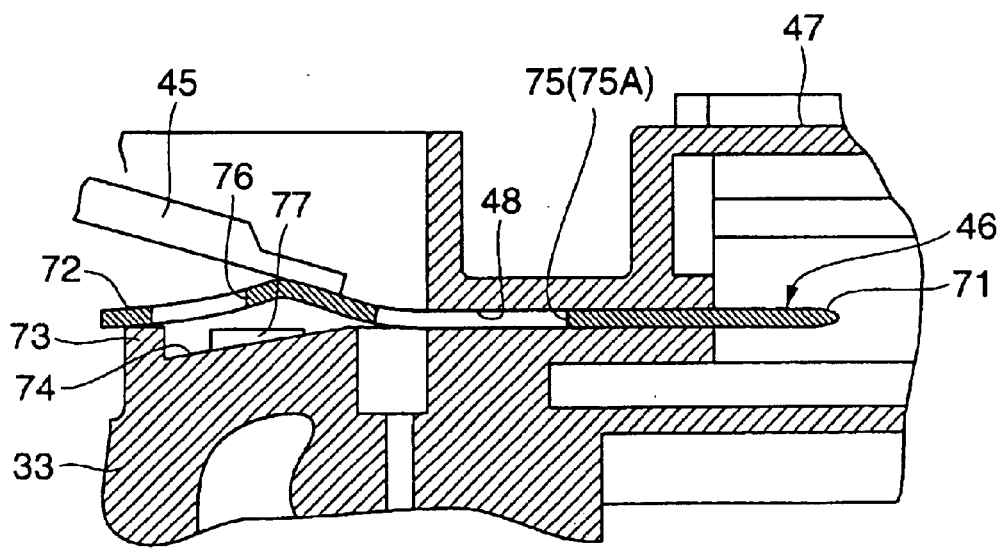

The main body portion 71 of the terminal 46 and the bent base end portion 72 elastically deform with respect to an upper surface of the rising wall 73 so as to overcome or get over the rising wall 73 as shown in FIGS. 10A and 10B. The bent base end portion 72 is arranged along the downward slope surface 74 when the main body portion 71 of the terminal 46 is completely inserted into the terminal insertion hole 48. The bent base end portion 72 of the terminal 46 inserted to the terminal insertion hole 48 is abutted against the rising wall 73 in a striking manner so as to be prevented from coming off, see FIGS. 4, 5, 10A, 10B and 11.

The terminal 46 is provided with an elastic deforming performance regulating portion 75 for the purpose of regulating an elastic deforming performance which is changed in accordance with a thickness and a width determined by the fit to the opposing connector in such a manner that the terminal 46 can be suitably elastically deformed with respect to the upper surface of the rising wall 73 mentioned above so as to overcome or get over the rising wall 73. In the present embodiment, an aperture portion 75A having a long hole shape or the like is provided in the terminal 46, and the aperture portion 75A is set as the elastic deforming performance regulating portion 75. The elastic deforming performance can be regulated by adjusting a diameter and a length of a hole of the aperture portion 75A.

In accordance with the present embodiment, since the elastic deforming structure of the terminal 46 in the electric motor 30 is provided as mentioned above, the following operations and effects can be obtained.

(1) The elastic deforming performance regulating portion 75 is provided in the terminal 46. Accordingly, it is possible to regulate the elastic deforming performance of the terminal 46 which is determined by the thickness and the width of the terminal 46 defined in accordance with the fit to the opposing connector, by the elastic deforming performance regulating portion 75. Therefore, it is possible to apply a proper elastic deforming performance to the terminal 46. The terminal 46 is always elastically deformed suitably with respect to the upper surface of the rising wall 73 in the brush holder 33 so as to get over the rising wall 73, is inserted to the terminal insertion hole 48, and abuts the bent base end portion 72 of the terminal 46 against the rising wall 73 so as to achieve the prevention of unintended disassembly. It is thereby possible to improve an assembling property of the terminal 46.

(2) The terminal 46 has the bent base end portion 72 which obliquely crosses to the main body portion 71, and elastically restores the bent base end portion 72 of the terminal 46 getting over the rising wall 73 of the brush holder 33 so as to be arranged along the downward slope surface 74 formed in the front side of the rising wall 73 in the brush holder 33. It is possible to securely abut the bent base end portion 72 of the terminal 46 against the rising wall 73, and it is possible to stably maintain the unintended disassembly prevention state.

(3) The aperture portion 75A of the terminal 46 is set as the elastic deforming performance regulating portion 75. Accordingly, it is possible to easily regulate the elastic deforming performance of the terminal by adjusting the hole diameter and the like of the aperture portion 75A.

(4) In the electric motor 30 of the motor-driven power steering apparatus 10, the above items (1) to (3) can be achieved.

(C) Unintended disassembly and drag-in preventing structure of terminal 46

The electric motor 30 is structured, as shown in FIGS. 4, 5 and 9A-11, such that a fitting hole 76 having a circular shape or the like is formed in the bent base end portion 72 of the terminal 46, and a projection 77 having a circular columnar shape or the like is formed on the downward slope surface 74 of the brush holder 33. It is thereby possible to completely fit the fitting hole 76 of the terminal 46 completely inserted into the terminal insertion hole 48 to the projection 77 of the brush holder 33. Accordingly, it is possible to prevent the drag-in.

Further, when the main body portion 71 of the terminal 46 which gets over the rising wall 73 of the brush holder 33 in accordance with elastic deformation is inserted into the terminal insertion hole 48 as mentioned above, and the bent base end portion 72 is arranged along the downward slope surface 74 of the brush holder 33 in the manner mentioned above, the fitting hole 76 of the terminal 46 is fitted to the projection 77 of the brush holder 33. The bent base end portion 72 of the terminal 46 is abutted against the rising wall 73 as mentioned above so as to be prevented from unintended disassembly.

The bent base end portion 72 of the terminal 46 is structured, as shown in FIG. 11, such that an entire surface of an end surface 72A abutting against the wall surface 73A of the rising wall 73 is brought into contact with the wall surface 73A of the rising wall 73 so as to be aligned with the wall surface 73A. The bent base end portion 72 is structured such that an angle of the end surface 72A with respect to a lower surface along the downward slope surface 74 of the brush holder 33 in FIG. 11 has an acute angle. Accordingly, the bent base end portion 72 of the terminal 46 securely nestles into the rising wall 73 in accordance with a component force in a direction of the base portion of the rising wall 73 due to a pressing force applied when attaching the opposing connector.

In accordance with the present embodiment, since there is an unintended disassembly and drag-in preventing structure of the terminal 46 in the electric motor 30 averaged in the manner mentioned above, (the following operations and effects can be obtained).

(1) The structure is made such that the fitting hole 76 of the terminal 46 inserted to into the terminal insertion hole 48 of the feed connector 47 is fitted to the projection 77 of the brush holder 33, whereby it is possible to fix and hold the terminal 46 with respect to the terminal insertion hole 48 in both the directions of coming off and dragging in. Accordingly, it is possible to prevent the terminal 46 inserted into the terminal insertion hole 48 from coming off from the terminal insertion hole 48 due to the pressing force or the like applied by the opposing connector when connecting to the opposing connector, and it is possible to prevent the terminal from being dragged in the terminal insertion hole 48 due to the pulling force applied by the opposing connector when canceling the connection to the opposing connector.

(2) The terminal 46 inserted into the terminal insertion hole 48 of the feed connector 47 is structured such that the bent base end portion 72 of the terminal 46 is abutted against the rising wall 73 of the brush holder 33, whereby unintended disassembly prevention is achieved.

(3) The terminal 46 has the bent base end portion 72 obliquely crossing to the main body portion 71. The bent base end portion 72 of the terminal 46 overcoming or getting over the rising wall 73 of the brush holder 33 is elastically restored so as to be arranged along the downward slope surface 74 formed in the front side of the rising wall 73 in the brush holder 33. It is possible to securely abut the bent base end portion 72 of the terminal 46 against the rising wall 73. It is also possible to securely fit the fitting hole 76 of the terminal 46 to the projection 77 of the brush holder 33, whereby it is possible to securely achieve the effects mentioned in the items (1) and (2) without being affected by the assembling accuracy.

(4) The entire surface of the end surface 72A abutting against the rising wall 73 in the bent base end portion 72 of the terminal 46 is provided so as to be aligned with the wall surface 73A of the rising wall 73. Accordingly, when the opposing connector applies the pressing force, the bent base end portion 72 of the terminal 46 nestles into the base end (a root with respect to the downward slope surface 74) of the rising wall 73 so as to make the abutting state with the rising wall 73 more difficult to come-off, and it is possible to securely achieve the effect mentioned in the item (2).

(5) In the electric motor 30 of a motor-driven power steering apparatus 10, the effects mentioned in the items (1) to (4) can be achieved.

(D) Placing structure of terminal 46 in electric motor 30 (FIGS. 3 to 6C, 8A to 8C, 9A to 9C, 12A and 12B)

The electric motor 30 is provided with an engagement portion formed in a notch shape or a hole shape in the terminal 46. In the present embodiment, as shown in FIGS. 9A to 9C, concave engagement portions 71A are notched in both side portions of a main body portion 71 close to a base end side of the terminal 46 to which the pigtail 45 is connected.

Figure 8A:
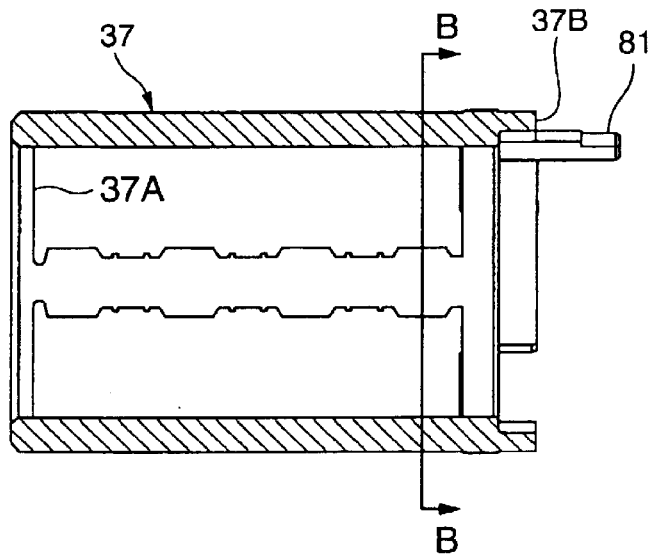
Figure 8B:
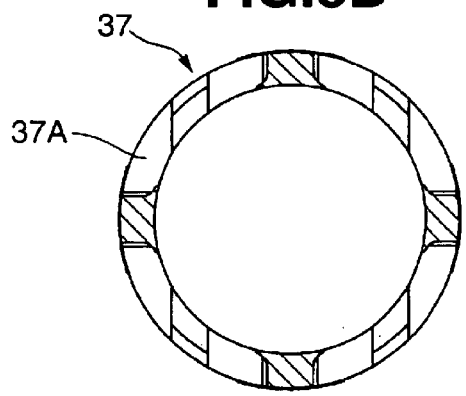
Figure 8C:
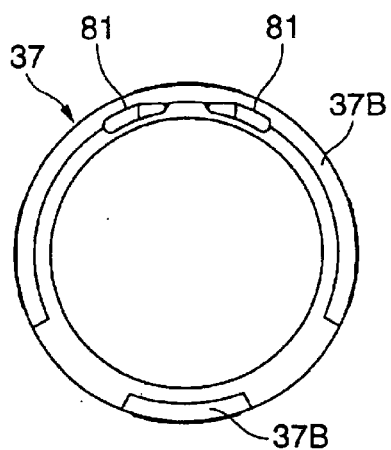

The electric motor 30 is provided with convex portions 81 on an end surface of the magnet holder 37 provided in the inner periphery of the yoke 36, as shown in FIGS. 8A to 8C. The convex portions 81 are provided in a protruding manner at a plurality of positions (two positions in the present embodiment) along the inner periphery of a circular arc engagement convex portion 37B of the magnet holder 37, as shown in FIGS. 8A to 8C. The electric motor 30 is structured, as shown in FIGS. 3 to 6C, such that in a state in which the yoke 36 (the magnet holder 37) and the brush holder 33 are connected together with the gear housing 11 by the bolt 34 in the manner mentioned above, the convex portion 81 mentioned above of the magnet holder 37 is aligned with the concave engagement portion 71A of the terminal 46 completely inserted into the terminal insertion hole 48 of the feed connector 47 integrally formed with the brush holder 33 in the manner mentioned above. Recess portions 82 are provided in positions corresponding to the concave engagement portion 71A of the terminal 46 and the convex portion 81 of the magnet holder 37. The recess portions 82 are provided in the positions along an engagement recess portion 52 formed in a short cylinder body 51 of the brush holder 33. Accordingly, when connecting the yoke 36 (the magnet holder 37), the brush holder 33 and the gear housing 11 by the bolt 34, the convex portion 81 of the magnet holder 37 is engaged with and inserted into the concave engagement portion 71A of the terminal 46 (FIG. 12A), and is further inserted into the recess portion 82 of the brush holder 33 via the concave engagement portion 71A.

In this case, the motor-driven power steering apparatus 10 is provided with a through hole shaped communication passage 83 capable of ventilating between the inner portion of the yoke 36 and the inner portion of the gear housing 11, in an inner portion of the recess portion 82 mentioned above in the partition wall 53 of the brush holder 33, as shown in FIGS. 3, 4 and 6A to 6C. In other words, the opening facing to the side of the magnet holder 37 of the communication passage 83 is set as the recess portion 82 mentioned above. At this time, the convex portion 81 of the magnet holder 37 is allowed to be inserted into the recess portion 82 via a narrow passage (not shown), and forms a shielding means for shielding foreign materials which are going to pass through the opening (the recess portion 82) of the communication passage 83.

In accordance with the present embodiment, since the placing structure of the terminal 46 in the electric motor 30 is provided in the manner mentioned above, the following operations and effects can be achieved.

Figure 12A:
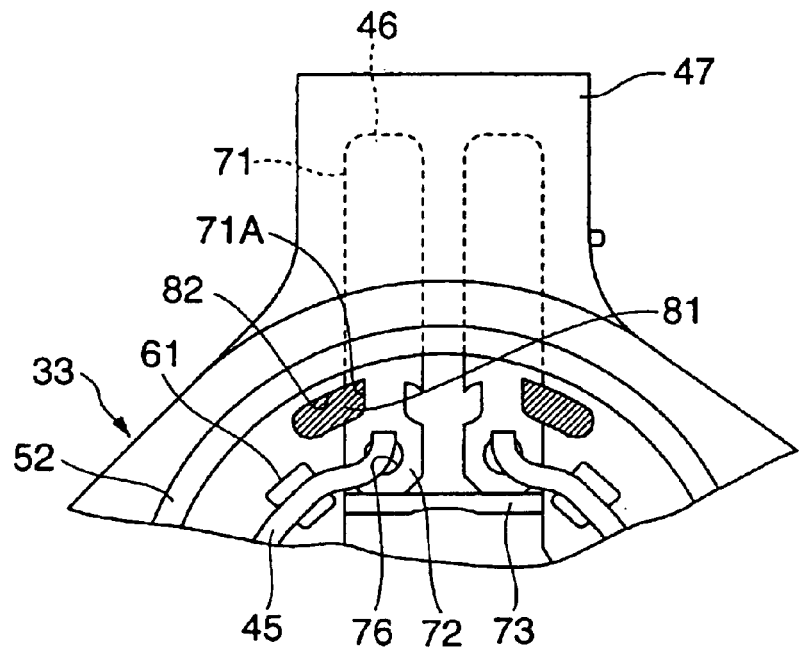

(1) In the electric motor 30, in a state in which the yoke 36 and the brush holder 33 are connected, as shown in FIG. 12A, the convex portion 81 of the magnet holder 37 is engaged with and inserted into the engagement portion 71A of the terminal 46 inserted to and previously assembled in the terminal insertion hole 48 provided in the feed connector 47 of the brush holder 33. Since the convex portion 81 of the magnet holder 37 is engaged with and inserted into the engagement portion 71A of the terminal 46 in a direction crossing with the inserting direction of the terminal 46 to the terminal insertion holder 48, (orthogonal direction in the present embodiment), it is possible to prevent the terminal 46 from coming off from the terminal insertion hole 48. Accordingly, when mounting the opposing connector to the feed connector 47, the terminal 46 is not pushed out by the feed terminal of the opposing connector so as to be prevented from coming off or unintentionally disassembling from the terminal insertion hole 48. The feed terminal and the terminal 46 are in this manner properly connected.

Figure 12B:
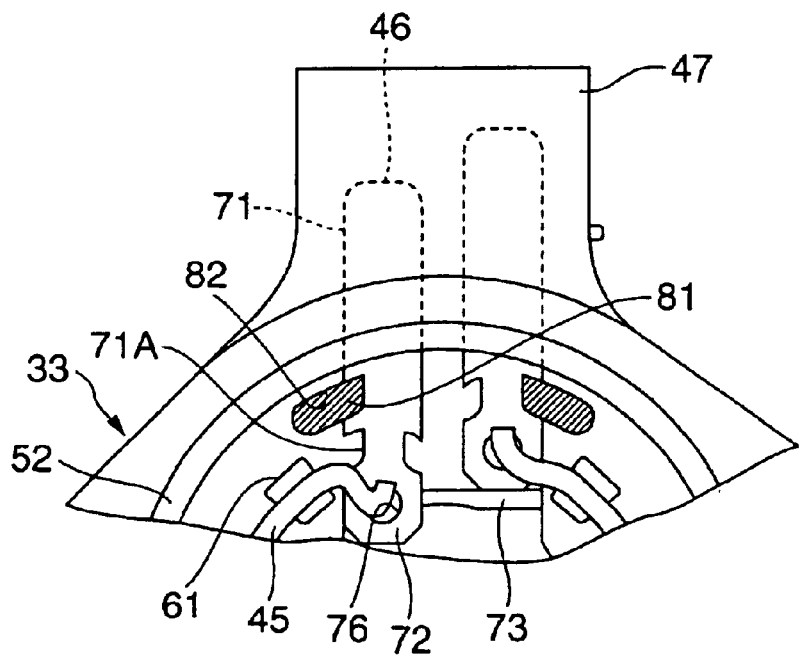

(2) In a bad or undesirable assembly state in which the terminal 46 is not completely inserted into the terminal insertion hole 48 of the feed connector 47, the convex portion 81 of the magnet holder 37 provided in the inner periphery of the yoke 36 does not correspond to the engagement portion 71A of the terminal 46 when connecting the yoke 36 to the brush holder 33. The convex portion 81 is brought into contact with portions other than the engagement portion 71A of the terminal 46 so as to be interfered, as shown in FIG. 12B. Therefore, it is impossible to connect the yoke 36 to the brush holder 33, thereby making it possible to find the bad or undesirable assembly of the terminal 46.

(3) The convex portion 81 of the magnet holder 37 is inserted into the recess portion 82 of the brush holder 33 via the engagement portion 71A of the terminal 46. Accordingly, when the convex portion 81 of the magnet holder 37 can not be inserted into the recess portion 82 of the brush holder 33 when assembling the yoke 36 and the brush holder 33, it is possible to find a defect in an assembled position between the brush holder 33 and the magnet holder 37 in the peripheral direction. Therefore, it is possible to prevent the brush 44 held by the brush holder 33 from being displaced from the magnet 38 of the stator 35 positioned by the magnet holder 37, and it is possible to prevent the rotation performance of the electric motor 30 from being different between the forward rotation direction and the reverse rotation direction.

(4) Since the brush holder 33 has the communication passage 83 extending through the partition wall 53, it is possible to allow breathing between the inner portion of the yoke 36 and the inner portion of the gear housing 11 by the communication passage 83 when the interior air of the yoke 36 is changing in temperature changed so as to be expanded and contracted in correspondence to the heating/cooling of the electric motor 30 on the basis of the operation of the motor-driven power steering apparatus 10. It is thereby possible to prevent a dew condensation or the like from being generated in the inner portion of the yoke 36.

(5) The convex portion 81 of the magnet holder 37 is inserted into the recess portion 82 formed by the opening facing the inner portion of the yoke 36 in the communication passage 83 provided in the brush holder 33, via the narrow passage, and the inner and outer sides of the yoke 36 are communicated by the bent passage. Accordingly, the convex portion 81 of the magnet holder 37 can prevent the foreign materials from passing without preventing the air breathing between the inner portion of the yoke 36 and the inner portion of the gear housing 11.

(6) If a grease applied to the periphery of the assist shaft 21 in the inner portion of the gear housing 11 is scattered at a time of operating the motor-driven power steering apparatus 10 in which the electric motor 30 is assembled in the gear housing 11, it is possible to prevent the grease from making an intrusion into the inner portion of the yoke 36 of the electric motor 30 from the communication passage 83 on the basis of the existence of the convex portion 81.

(7) Prior to the electric motor 30 being assembled in the gear housing 11, it is possible to prevent dust in the ambient air from making an intrusion into the inner portion of the yoke 36 in the electric motor 30 from the communication passage 83 on the basis of the existence of the convex portion 81.

(8) In the electric motor 30 of the motor-driven power steering apparatus 10, it is possible to achieve the above items (1) to (7).

In accordance with the present invention, in an electric motor in which the terminal is inserted into the terminal insertion hole it is possible to prevent a terminal inserted into a terminal insertion hole from coming off or being unintentionally disassembled from the terminal insertion hole and to securely prevent the terminal from being dragged into the terminal insertion hole.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An electric motor comprising:
   a brush holding portion provided in a brush holder; and
   a terminal insertion hole to which a terminal connected to a brush is insertable, the terminal insertion hole being provided in a feed connector integrally formed with the brush holder;
   a base end portion of the terminal having a fitting hole, and a projection disposed in the brush holder, and
   wherein the fitting hole of the terminal inserted into the terminal insertion hole is freely fitted to a projection of the brush holder.

2. An electric motor as claimed in claim 1, wherein a rising wall is formed in a rear side of the terminal insertion hole in the brush holder, and
   wherein the terminal is elastically deformed with respect to an upper surface of the rising wall so as to overcome the rising wall, and is inserted into the terminal insertion hole, the fitting hole of the terminal is fitted to the projection in the brush holder, and a base end portion of the terminal is abutted against the rising wall so as to be prevented from unintentional disassembly.

3. An electric motor as claimed in claim 2, wherein the terminal is formed in a flat plate shape, having a main body portion inserted into the terminal insertion hole and a bent base end portion obliquely crossing to the main body portion, and forming a fitting hole in the base end portion,
   a downward slope surface forming a downward slope toward the rising wall being formed in a front side of the rising wall in the brush holder, and a projection being formed in the downward slope surface, and
   wherein the bent base end portion of the terminal getting over by elastic deformation of the upper surface of the rising wall is arranged along the downward slope surface, and the fitting hole is fitted to the projection.

4. An electric motor as claimed in claim 3, wherein an entire surface of an end surface abutting against the wall surface of the rising wall in the bent base end portion of the terminal conforms to the wall surface of the rising wall.

5. An electric motor as claimed in claim 1, wherein the fitting hole of the bent base end portion is formed in a circular shape, and the projection of the brush holder is formed in a circular columnar shape.

6. An electric motor as claimed in claim 2, wherein the fitting hole of the bent base end portion is formed in a circular shape, and the projection of the brush holder is formed in a circular columnar shape.

7. An electric motor as claimed in claim 3, wherein the fitting hole of the bent base end portion is formed in a circular shape, and the projection of the brush holder is formed in a circular columnar shape.

8. An electric motor as claimed in claim 4, wherein the fitting hole of the bent base end portion is formed in a circular shape, and the projection of the brush holder is formed in a circular columnar shape.

9. An electric motor as claimed in claim 3, wherein an angle formed by an end surface of the bent base end portion abutting against the wall surface of the rising wall, and a lower surface of the base end portion arranged along the downward slope surface of the brush holder forms an acute angle.

10. A motor-driven power steering apparatus using the electric motor as claimed in claim 1.

11. A motor-driven power steering apparatus using the electric motor as claimed in claim 2.

12. A motor-driven power steering apparatus using the electric motor as claimed in claim 3.

13. A motor-driven power steering apparatus using the electric motor as claimed in claim 4.

14. A motor-driven power steering apparatus using the electric motor as claimed in claim 5.

15. A motor-driven power steering apparatus using the electric motor as claimed in claim 6.

16. A motor-driven power steering apparatus using the electric motor as claimed in claim 7.

17. A motor-driven power steering apparatus using the electric motor as claimed in claim 8.

18. A motor-driven power steering apparatus using the electric motor as claimed in claim 9.

* * * * *